March 29, 1960     E. J. BERENS     2,930,128
DENTAL COTTON ROLL HOLDER
Filed Oct. 4, 1957

INVENTOR.
Edward J. Berens

United States Patent Office 2,930,128
Patented Mar. 29, 1960

2,930,128

DENTAL COTTON ROLL HOLDER

Edward J. Berens, Hammond, Ind.

Application October 4, 1957, Serial No. 688,155

4 Claims. (Cl. 32—35)

This invention relates to the oral cavity and particularly to a moisture absorbent body and holding device therefor for use in the oral cavity.

An object of the invention is a simple device for holding a cylindrical body which device provides spring action.

Another object is a device for holding a roll of dental absorbent cotton in a particular position in an oral cavity.

A further object is a device for holding a tube in a particular position in an oral cavity, for example the tube attached to the saliva ejector.

Yet another object is an appliance comprising a holding device for a moisture absorbing cylindrical body, which appliance possesses spring action and assists in keeping the mouth of the patient open when positioned within the oral cavity, thereby relieving strain on the musculature of the oral cavity.

Another object is an appliance comprising cylindrical absorbent body and a holder therefor which can be positioned in an oral cavity to separate the buccal surfaces of the posterior teeth from the cheek muscles while keeping the buccal surface of the teeth substantially dry; said separation being obtained with essentially no interference with the passage of light through the mouth to the teeth.

Still another object is an appliance comprising a roll of dental cotton and a holding device therefor which can be positioned in the oral cavity to absorb saliva, blood and other liquids without requiring auxiliary devices for maintaining said appliance in position; said appliance permitting ready access to the surfaces of the teeth while absorbing moisture from the oral cavity.

A further object is an appliance which can be placed in an oral cavity to maintain the mouth in an open position and yet permit the patient to talk without undue strain on the musculature of the oral cavity.

A particular object is a device for holding cylindrical bodies within the oral cavity which device is inexpensive and is easily sterilized.

Another particular object is a device for holding cylindrical bodies within the oral cavity, which device affords little or even no contact between the tooth surface and the material forming the device.

Other objects will become apparent in the course of the description of the invention.

The device of the invention is adapted for holding a cylindrical body such as a roll of dental absorbent cotton or a rubber tube. The device comprises a flat-spring member which is quite long with respect to its width, i.e., may be described as slender or elongated. The flat-spring member is thin enough to be readily changed from a straight configuration to a bowed shape by ordinary finger pressure and yet thick enough to afford a spring action of sufficient strength to maintain the appliance in the position in which it has been placed in the oral cavity. At each end of the flat-spring member there is affixed a clamping member. The clamping member has at least one arcuate jaw element, which arcuate jaw element is adapted for containing the cylindrical body. The clamping members are affixed to the flat-spring member so as to be on the common side, i.e., same side of the flat-spring member.

The holding device may be a unitary structure wherein the flat-spring member and the clamping members are formed out of a single piece of material. Or the device may be made up from several individual pieces for example, the clamping members may be made separate from the flat-spring member and affixed thereto by welding.

The jaw elements of the clamping member are so disposed that the cylindrical body is not completely enclosed by the jaw elements thereby permitting the cylindrical body to rest against the surface of the teeth and reducing and even eliminating contact of the tooth surface with the material forming the jaw element.

Figure 1:
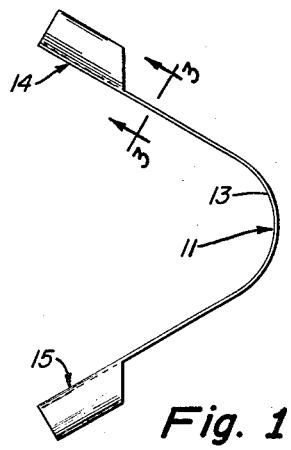
Figure 1 shows in plan view one embodiment of the holding device of the invention.
Figure 3:
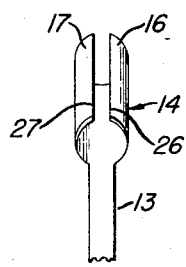
Figure 3 shows a detail view of the clamping member which contains the cylindrical body of Figure 1 taken along the line 3—3.

In Figure 1 there is shown one embodiment of the holding device of the invention numeral 11 refers to the entire holding device. The device 11 comprises elongated, thin, flat-spring element 13. Element 13 has sufficient strength that in the absence of pressure applied to the clamping members 14 and 15 spring element 13 would rest in a straight configuration. However, the pressure needed to change the configuration of element 13 should not be greater than that which is comfortably exertable by an adult human hand. Although element 13 is described as a flat-spring it is to be understood that element 13 may actually be in the form of an arc in order to provide greater strength for a given thickness of the material forming element 13. The device of Figure 1 is a unitary structure because element 13 and clamping devices 13 and 14 were formed out of a single sheet of material. Referring to Figure 3 clamping device 14 is composed of two curvilinear spring elements 16 and 17. Curvilinear spring elements 16 and 17 extend from opposite edges of element 13 extended into clamping member 14. The curvilinear spring elements 16 and 17 form two jaws which will contain the cylindrical body. These elements 16 and 17 are of such an arc that a sufficient gap is afforded between the opposed ends 26 and 27 of the curvilinear spring elements 16 and 17. The amount of gap afforded will be dependent upon the size of the cylindrical body which is to be contained by the clamping members and also by the resiliency of the cylindrical body, i.e., the ease with which the jaw elements 16 and 17 may dig into the body with consequent bulging of the body through the gap in such a way as to cover edges 26 and 27 and thereby avoid contact of material of construction with the tooth surface. It is to be understood that instead of having a curvilinear element such as 16 and 17 clamping member 14 and 15 may be provided with relatively narrow arcuate jaw elements which narrow jaw elements may be easily covered by the bulging of the roll of dental absorbent cotton contained by the arcuate jaw elements.

Figure 4:
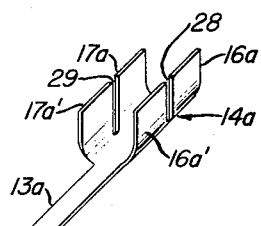
Figure 4 shows another embodiment of a clamping member suitable for use in the device of the invention.

Figure 4 shows another embodiment of clamping member 14a. In this embodiment curvilinear spring elements are not curved as much as elements 16 and 17 in Figure 3. Also the curvilinear spring elements are in the form of two pairs. Element 16a and 17a form one pair of opposed curvilinear spring elements and element 16a' and 17a' form another pair of opposed elements. The two pairs of curvilinear spring elements are separated by slots 28 and 29. This may be used where the material of construction has a strength such that finger pressure would not be enough to force the curvilinear elements to a position such that the cylindrical body would be securely contained by them.

Figure 5:
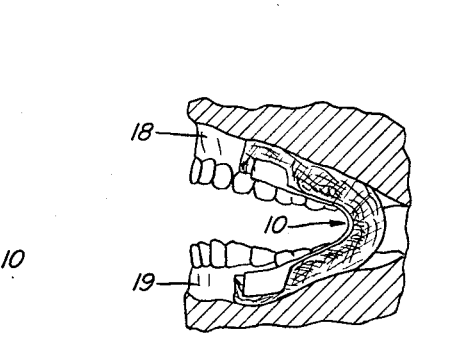
Figure 5 shows one mode of use of the appliance of the invention.
Figures 6, 8:
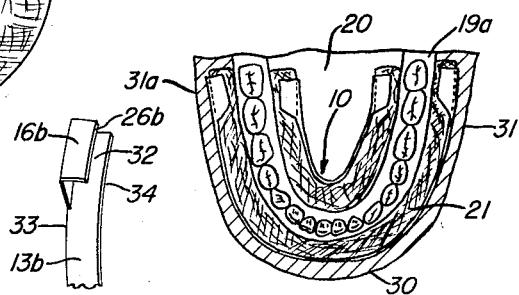
Figure 6 shows another mode of use of the appliance of the invention.
Figure 8 shows a detailed view of clamping member of Figure 7 along the line 8—8.
Figure 7:
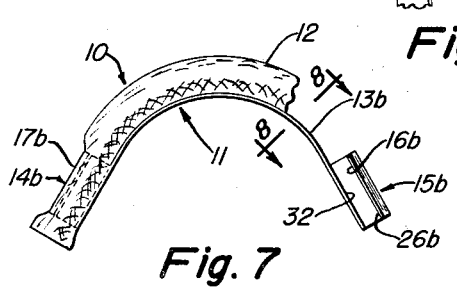
Figure 7 shows another embodiment of the device of the invention and its manner of containing an absorbent cotton roll.

Figures 7 and 8 show another embodiment of the holding device 11. In Figure 7 the cylindrical body 10 which may be a roll of absorbent dental cotton or a rubber tube is shown as a roll of absorbent cotton 12. The flat-spring like member is designated 13b. Clamping device 14b and 15b are formed at the ends of the flat-spring like member. In this embodiment curvilinear element 16b extends from edge 33, shown in Figure 8, of end 32 of member 13b. The curvilinear element 16b extends above the side of said flat-spring element 13b which is common to both curvilinear element 16b and 17b and is bowed over to afford a substantial gap between the far end 26b of the curvilinear spring element 16b and the opposite edge 34 of said spring element end 32. Thus in this embodiment the flat-spring element 13b provides a buttress against which the single curvilinear spring element 16b and 17b can force the cylindrical body. This embodiment of the holding device is particularly suitable in that the materials of construction are kept entirely away from the tooth surface with the material of construction resting on the muco-buccal fold and the buccal surface of the cheeks when the appliance is positioned in the mouth as is shown in Figure 5. Figure 7 shows that when a roll of absorbent cotton is contained in this embodiment the cotton bulges out of the gap afforded by ends of element 13b and curvilinear elements 16b and 17b to cover edges of the flat-spring element and the curvilinear elements shown as 34 and 26b in Figure 8 and eliminate metal to tooth surface contact. Also the end of the roll of cotton 12 extends beyond the clamping device as shown at 14b to protect the far end of the clamping device from metal contact with the tooth surface.

Figure 2:
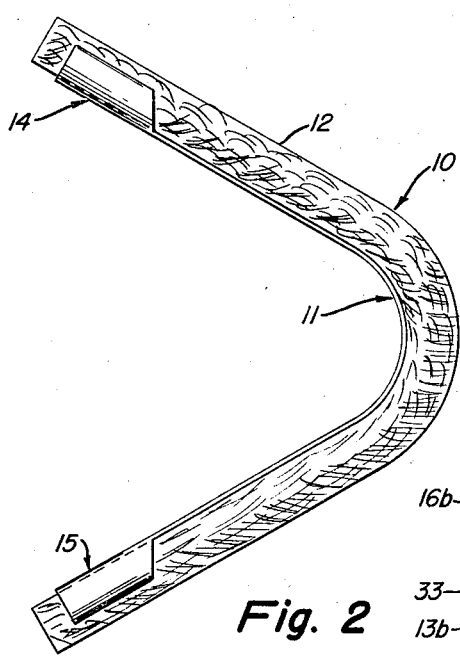
Figure 2 shows one embodiment of the appliance of the invention wherein a roll of dental absorbent cotton is contained by the device of Figure 1 approximately in the configuration needed for entry into an oral cavity.

Figures 5 and 6 show two modes of using the appliance of the instant invention in an oral cavity. In Figure 5 an appliance such as is shown in Figure 2 is positioned to assist in keeping the mouth open while at the same time providing absorbency for the removal of moisture accumulating in the oral cavity. It is evident that the spring action of member 13 tends to force the upper jaws 18 and 19 apart and at the same time the patient may move the cheeks to permit communicating with the person working in the oral cavity.

In Figure 6 there is shown the use of two appliances in the lower jaw cavity. Appliance 10 is shown positioned inside the lingual surfaces of the teeth. Appliance 21 is positioned between the labial surface 30 and buccal surfaces 31 and 31a of the teeth.

The holding device of the invention may be made from any material of construction which provides the necessary spring action and also permits ready sterilization of the surface of the device. The device may be made of any of the various metals used by the dental profession, stainless steel is a particularly suitable material of construction. The device may also be made of various plastics which can withstand sterilization conditions and afford the necessary spring action. Examples of suitable plastics are nylon, Dacron, and perlon.

Although the invention has been described in terms of its use in the human mouth it is to be understood that the holding device and the appliances may be made in sizes suitable for use with animals such as horses and dogs. Furthermore, the appliance may be used in the human mouth not only by members of the dental profession but also by the medical profession when operatings are made through the oral cavity. The appliances then affording all of the advantages to the practitioner with respect to keeping the mouth open and absorbing liquids entering the oral cavity that are afforded to the dentist.

Thus having described the invention, what is claimed is:

1. A dental device adapted for holding a cotton roll in the oral cavity which dental device consists of a slender flat-spring member and, affixed at each end of said slender member, a clamping member having at least one arcuate jaw element adapted for containing a cylindrical body, said element in each clamping member being on the common side of said slender member, said flat-spring member and said clamping members being normally in substantially straight configuration and being capable of taking on a resilient bowed shape as required to position said cotton roll in an oral cavity.

2. A unitary dental device adapted for holding a cotton roll in the oral cavity which dental device consists of an elongated, thin flat-spring element and, positioned at each end of said flat-spring element, at least one curvilinear-jaw element adapted for containing a cylindrical body, said elements extending from the common side of said flat-spring element, and said flat-spring element and said jaw-elements being normally in substantially straight configuration and being capable of taking on a resilient bowed shape as required to position said cotton roll in an oral cavity.

3. A unitary dental device adapted for holding a cotton roll in the oral cavity which dental device consists of an elongated, thin flat-spring element and at each end of said flat-spring element, at least one pair of curvilinear-spring elements which extend beyond the common side of said flat-spring element and afford a substantial gap between the opposed ends of each pair of said curvilinear-spring elements, said flat-spring element and said curvilinear-spring elements being normally in substantially straight configuration and being capable of taking on a resilient bowed shape as required to position said cotton roll in an oral cavity.

4. A unitary dental device adapted for positioning a cotton roll in an oral cavity which dental device consists of an elongated, thin, flat-spring element and, at each end of said flat-spring element, at least one curvilinear-spring element which extends from the common edge of and above the common side of said flat-spring element to afford a substantial gap between the far end of said curvilinear-spring element and the opposite edge of said flat-spring element, said flat-spring element and said curvilinear-spring elements being normally in substantially straight configuration and being capable of taking on a resilient bowed shape as required to position said cotton roll in an oral cavity.

References Cited in the file of this patent

UNITED STATES PATENTS

| | | |
|---|---|---|
| 1,010,146 | Ivory | Nov. 28, 1911 |
| 2,614,325 | Hartig | Oct. 21, 1952 |
| 2,651,109 | Kanter | Sept. 8, 1953 |
| 2,678,645 | Raimo | May 18, 1954 |